United States Patent [19]

Grudzinski

[11] 4,322,724

[45] Mar. 30, 1982

[54] LOW VOLTAGE OPERATED ELECTRIC CIRCUITS

[75] Inventor: Richard Grudzinski, La Chaux-de-Fonds, Switzerland

[73] Assignee: Jocelyne Payot, La Chaux-de-Fonds, Switzerland

[21] Appl. No.: 163,013

[22] Filed: Jun. 25, 1980

[30] Foreign Application Priority Data

Jun. 29, 1979 [CH] Switzerland ............... 6106/79

[51] Int. Cl.³ ............... G08B 17/06; H02M 3/335
[52] U.S. Cl. ............... 340/595; 331/112; 340/539; 363/18
[58] Field of Search ............... 340/595, 539; 455/127; 363/18; 331/112; 250/212

[56] References Cited

U.S. PATENT DOCUMENTS

| | | | |
|---|---|---|---|
| 3,531,737 | 9/1970 | Thakore | 331/112 |
| 3,681,674 | 8/1972 | Terry, Jr. | 363/18 |
| 3,980,996 | 9/1976 | Greenspan et al. | 455/127 |

Primary Examiner—John W. Caldwell, Sr.
Assistant Examiner—Daniel Myer
Attorney, Agent, or Firm—Pollock, Vande Sande & Priddy

[57] ABSTRACT

An electronic device comprises an arrangement which makes it possible to power a transmitter in self-contained fashion from a pick-up without any other power source. The device comprises at least one transistor and a transformer having a high turns ratio. The primary windings are connected in series with controlled electrodes of the transistor. The secondary windings of the transformer act on the controlling electrode of the transistor and the very low voltage is applied across the primary windings and the controlled electrodes. Voltages of a few mV which are thus applied result in the appearance of voltage pulses of a usable magnitude at the terminals of the secondary winding which may be accumulated in a capacitor to feed the transmitter intermittently. This device can be used in a self-contained detector-transmitter for use as a remote fire alarm.

19 Claims, 4 Drawing Figures

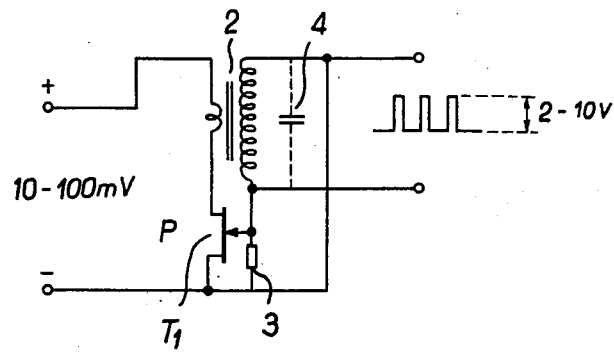
FIG_1
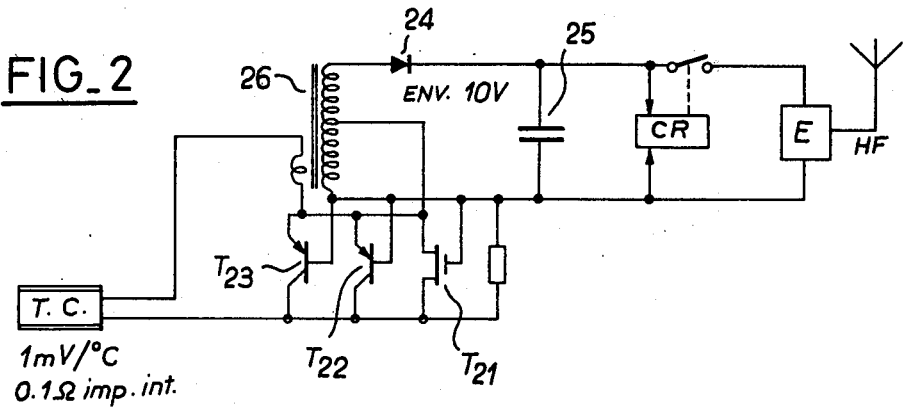
FIG_2
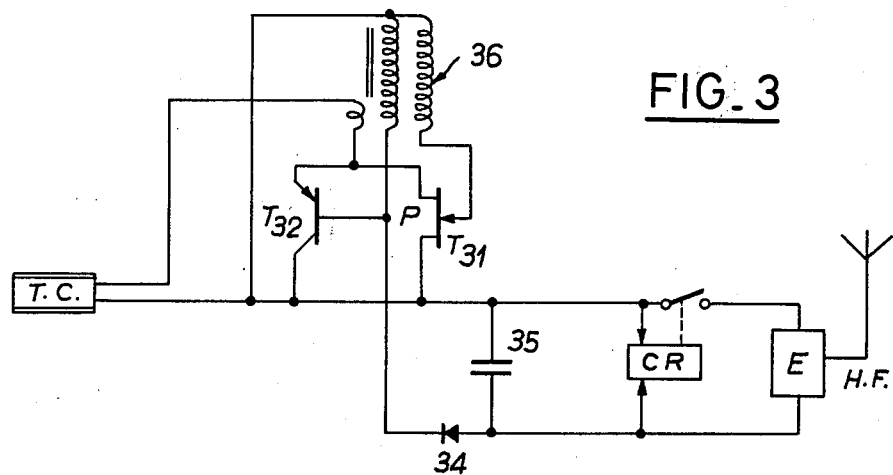
FIG_3

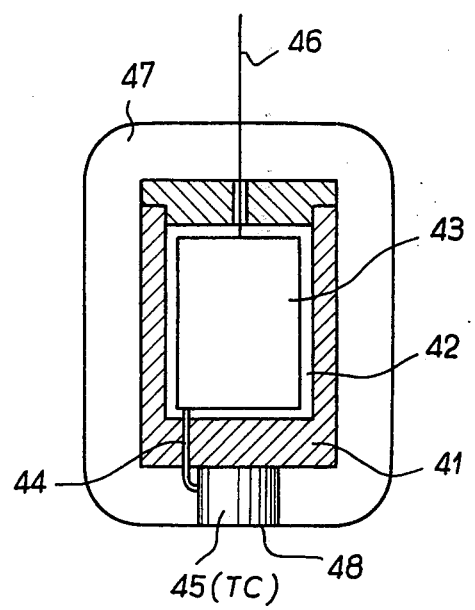
FIG_4

LOW VOLTAGE OPERATED ELECTRIC CIRCUITS

BACKGROUND TO THE INVENTION

The present invention relates to an electronic device for converting a source of very low voltage into a voltage for operating electrical apparatus and to a self-contained detector-transmitter unit including such a device and to a unit comprising a self-contained detector-transmitter remote fire alarm.

The state of the art comprises a large number of devices which are sources of a very low electrical voltage. For example, thermocouples (when they are subject to a relatively low temperature differential of the order of 50° to 100° C.), microphones, certain electromechanical or electromagneto-mechanical pick-ups or probes, certain photoelectric cells. The voltages produced by these devices or pick-ups are generally used as input signals to control various electronic apparatus. These very low voltages are amply sufficient for such control since many forms of electrical apparatus are known which are capable of reacting to input voltages of around a few microvolts. These apparatus detect the very low voltages and are always provided with a source of electric power, a battery, power pack, mains connection for example. For certain applications in which very small supply voltages are quite adequate to operate the apparatus, the very low voltage devices or pick-ups themselves, which generally have very low internal impedances to give not inconsiderable current levels, would be capable of supplying the desired supply power, considered solely from the point of view of energy balance. This has been possible, at least under laboratory conditions, when the very low voltages are alternating voltages, such as is the case, for example, with an output signal from a microphone. On the other hand, when the very low voltage is a direct current voltage, such as produced, for example, by a thermocouple, the use of such a direct current voltage as a supply for operating an apparatus has not so far been possible in view of the very low voltage level.

Direct current voltage boosters are known which, for example, raise a direct current voltage of approx. 1.5 V from a battery to a level of 3 or 4.5 V. For such an arrangement to operate, however, it has so far always been necessary for the voltage which it is desired to increase, to be of a magnitude necessary to serve as a supply voltage for an electronic apparatus. This minimum supply voltage to operate an apparatus is around 1 V approximately, since the active elements suitable for use in electronic equipment of the type in question have threshold voltages which are close to 1 V. This prohibits operation when the supply voltage is much lower than 1 V. Consequently, sources of direct current voltage of a few mV (not exceeding 100 or 200 mV) have never been able to be used as an energy source capable of powering electrical apparatus, that is to say capable of making this apparatus independent of the presence of an independent power source (battery, power pack, mains, etc). These very low direct current voltage sources have therefore been used simply as a signal source and the apparatus which processed them have had to be provided with their own power source.

This is a very serious drawback when, in order to be able to be effectively used, the device or pickups supplying a very low direct current voltage, such as for example thermocouples serving as fire alarm detectors, have had to be installed in very large numbers, spread over a large space, at places often very inaccessible. Indeed, in such cases, considerable difficulties are found in inspecting, maintaining and, when necessary, exchanging batteries or power packs for providing energy to each of these devices or pick-ups.

In forest fire fighting for example, early detection of fires, the only way of effectively fighting large-scale fires, is possible only by means of providing detectors, typically thermocouples, in a very large number of places in the forest which is to be protected; no part of the forest should be more than about 20 to 30 m or even 50 m from a pick-up for detecting the start of a fire, for immediate detection of incipient fires to be ensured. In large forests which for example may extend over several tens of square kilometers, this requires the presence of thousands of detectors and the necessity for maintaining them, mainly due to the use of a battery, represents a tremendous increase in cost and organisational complexity, to the extent of rendering them virtually prohibitive.

The present invention sets out to provide an advantageous solution of the problems which have just been mentioned and its object is in particular to provide in a simple and advantageous manner an electronic device which makes it possible for a low voltage source to be used in a self-contained fashion.

Another object of the invention is to provide the necessary elements to allow use of this device in the production of a self-contained detector-emitter remote fire alarm unit.

Yet a further object of the invention being to provide a unit constituting a self-contained detector-emitter remote fire alarm which is of advantageous and simple construction while being at the same time capable of providing highly reliable technical service which may be expected of such a device, but at virtually insignificant running costs.

SUMMARY OF THE INVENTION

According to a first aspect of the invention, there is provided an electronic device for converting a source of very low voltage into a voltage for operating electrical apparatus, the device comprising at least one transistor having a controlling electrode for controlling the current flow between two controlled electrodes, a transformer having primary and secondary windings with a high turns ratio between the primary and secondary windings, a first connection connecting the primary winding in series with the controlled electrodes of the transistor, a second connection connecting the secondary windings between one of the controlled electrodes and the controlling electrodes whereby a very low voltage applied across the primary winding and the controlled electrodes causes the device to oscillate and produce, across the secondary windings, voltage pulses of sufficient magnitude to operate electrical apparatus such as a radio transmitter, the device having no other source of electrical power than the source of very low voltage.

According to a second aspect of the invention, there is provided a self-contained detector-transmitter unit including an electronic device according to the first aspect of the invention enclosed within the unit, a thermocouple connected across the primary windings and the controlled electrodes to serve as the said source of very low voltage, a capacitor connected across the secondary windings via a rectifier to receive the energy from each said voltage pulse produced by the secondary windings, the capacitor receiving a power $P_f$, and a radio transmitter circuit connected to the capacitor for continuous or intermittent operation thereby each time the capacitor discharges.

According to a third aspect of the invention, there is provided a unit comprising a self-contained detector-transmitter remote fire alarm comprising a thermocouple device furnishing a very low voltage at a very low impedance, the unit comprising an oscillator circuit comprising at least one transistor of which the or at least one is a field effect transistor, the controlled electrodes of all the transistors being in parallel, and a transformer having at least primary and secondary windings having different numbers of turns so that they have between them a high turns ratio, the primary winding being connected in series to the controlled electrodes of the at least one transistor and the secondary winding being connected between the controlling electrode of the at least one transistor and another electrode of the at least one transistor, the said thermocouple device being connected across the primary winding and the controlled electrodes of the at least one transistor, the secondary winding furnishing voltage pulses which are of a usable amplitude, a capacitor connected to the secondary windings via a rectifier for accumulating the electrical energy provided by each of the said voltage pulses, a radio transmitter circuit comprising at least one active element having a nominal supply voltage $U_n$ and operable at a given fraction $KU_n$ of this nominal voltage, an electronic gate arrangement having substantially nil power consumption in the non-passing state and connected between the said capacitor and the said radio transmitter and for connecting the radio transmitter with the said capacitor to supply the radio transmitter with power when the voltage at the capacitor reaches the said nominal voltage $U_n$ and for disconnecting the radio transmitter from the capacitor when the voltage at the capacitor drops to the said given fraction $KU_n$ of the said nominal voltage, the said transmitter being provided with a high frequency circuit and an antenna giving a range of about 1 km and transmitting oscillations modulated according to a code which, upon reception, makes it possible to recognise the transmitter from among others, a metal case housing the oscillator circuit, the rectifier element, the capacitor and the at least one active component of the radio transmitter, the metal case having a high thermal inertia and being enclosed by an insulating mass constituting a heat shield, the said thermocouple, in the form of a capsule having two junctions, being disposed in the thickness of the heat shield with one junction in contact with the metal case while its other junction is exposed to the ambient atmosphere, whereby the whole forms a compact unit which shows to the ambient atmosphere only the outer surface of the heat shield, one junction of the thermocouple and the antenna formed by a conductor wire emerging from the heat shield.

BRIEF DESCRIPTION OF THE DRAWINGS

FIG. 1 is a diagram of a first embodiment of the invention comprising a voltage booster circuit capable of operation by a very low voltage;

FIG. 2 is a diagram of a circuit similar to that in FIG. 1 but for use with a self-contained detector-emitter remote fire alarm;

FIG. 3 is a diagram similar to that in FIG. 2 illustrating an alternative form of an electronic voltage booster circuit operated by a very low voltage and included in the self-contained detector-emitter remote fire alarm; and FIG. 4 is a diagrammatic sectional view of a self-contained detector-emitter remote fire alarm of low bulk and cost, the fire alarm being capable of being assembled in a wide number of versions and being capable of monitoring a fire hazard over a very wide area.

DESCRIPTION OF THE PREFERRED EMBODIMENTS

The circuit in FIG. 1 comprising a field effect transistor $T_1$ of a type having a non-infinite source-drain impedance for a zero voltage at the gate. The transistor $T_1$ has a diffused gate and is not insulated, that is to say its gate has an impedance which is never infinite but which is nevertheless substantially higher than that of a bipolar amplifier transistor. The transistor $T_1$ could however be a field effect transistor having an insulated gate. In series with the source-drain gate of the transistor $T_1$, there is connected a primary winding of a transformer 2. The primary winding has comparatively few turns while the secondary winding has a substantially greater number of turns (typically 10 to 100 times greater). The secondary winding is connected between the drain (or the source) and the gate of the transistor $T_1$. A high value resistor 3 is connected between the gate and the drain of the transistor $T_1$.

FIG. 1 also shows in dotted lines a capacitor 4 which represents the distributed capacitances of the transistor and of the secondary winding of the transformer 2.

The series connection of the source-drain region of the transistor $T_1$ and of the primary winding of the transformer 2 constitutes an input circuit to the terminals of which will be connected a source of very low direct current voltage, typically between 6 and 200 mV. If the turns ratio of the transformer 2 is adequate and, furthermore, if the desired polarity conditions of the transistor and of the direction of connection of the windings of the transformer are achieved, a signal having voltage peaks typically between 2 and 10 V appears at the terminals of the secondary winding of the transformer 2 when a very low voltage, of for example a few dozen millivolts, or even less, is applied to the input terminals of the circuit comprising the primary winding of the transformer 2 and the source drain region of the transistor $T_1$. This output signal, having voltage pulses within the range of voltages usable as a supply voltage for electronic apparatus, is shown in FIG. 1 as a series of square pulses.

In operation, the very low voltage applied to the source drain region of the transistor $T_1$ causes, initially, a current to pass through the primary winding of the transformer 2. The transistor $T_1$ may be a P-channel or an N-channel. If P-channel, a negative voltage at its gate renders the channel all the more conductive. The increase in current, which in itself small, produces a considerable voltage in the secondary winding. If half the supply voltage, that is to say at least 5 mV, is present at the terminals of the primary side of the transformer, a transformer turns ration of 1:20 will produce a voltage change of 100 mV at the gate of the transistor $T_1$. This voltage, negative according to the polarities shown in FIG. 1, will reduce the resistance of the source-drain region of the transistor $T_1$, and hence cause a further increase in current to maintain and even increase the operating voltage to the point where the transistor is almost saturated. Next, since the current increases no further, the operating voltage diminshes, producing a diminution in current which induces a positive operating voltage tending to block the transistor, which rapidly leads to a complete blockage of the transistor. The rapidity of this phenomenon depends on the self-induction relationships in the transformer 2, as well as the distributed capacitance symbolised by the capacitor 4.

When a rectifier is used to rectify the output pulses of the circuit of FIG. 1, it is possible to charge a capacitor which will have a voltage which may be within a range from 2 to 10 V depending on the transformer turns ratio and on the value of the very low voltage applied to the input. It is evident that the power which may be drawn from this capacitor will depend on the power delivered by the very low voltage source. It is possible to use as a source, a thermocouple for example having a sensitivity of 1 mV/°C., with an internal resistance which is markedly less than 1 ohm. For a temperature differential between 50 and 100°, this thermocouple will deliver a voltage of between 50 and 100 mV. The power drawn from the thermocouple will depend on the minimum resistance offered by the transistor during the course of operation. Assuming that the passage resistance of the transistor in the saturated state may drop to approximately 1 ohm, the peak current delivered by the thermocouple will be 50 mA at 50 mV. The maximum instantaneous power would therefore be 2,500 μW, that is to say 2.5 mW. Naturally, this power is only delivered for a part of the time, so that under the aforesaid conditions it is possible to count on the availability, at the output, of a power of around 1 mW or at least a fraction of a mW.

With a field effect transistor, for a given state of the transformer, the peak voltage of the pulses is substantially proportional to the very low voltage applied to the input. The circuit of FIG. 1 has been realised by using a transistor of one of the types BSV 78, BSV 80, 2 N 4391, 2 N 4393, with a transformer constructed on a Philips ferrite base of type RM 6, with two turns in the primary winding and approximately 200 turns in the secondary winding.

Tests have been carried out with various types of transistors, field effect, diffused gate, field effect with an insulated gate, bipolar. The results are virtually the same with both types of field effect transistor; the input voltage threshold at which oscillation starts is slightly lower with a field effect transistor having an insulated gate but it does not in any case exceed 10 mV even with a field effect transistor having a diffused (non-insulated) gate. With bipolar transistors, the same circuit operates but oscillations are only generated with difficulty.

In addition, with a bipolar transistor, the amplitude of the output pulses is no longer proportional to the very low input voltage but is determined by the Zener voltage effect of the bipolar transistor. However, the width of the pulses and, therefore the energy per cycle, increases when the input voltage increases. Using bipolar transistors may therefore be desired since they provide, at the output (after rectification of the voltage and accumulation in a capacitor) a practically constant voltage whatever the magnitude of the very low input voltage, provided this voltage is above a certain threshold. Thus, with a bipolar transistor it is possible to have a threshold voltage of about 60 mV so that at input voltages below 60 mV no output voltage is produced while, for input voltages exceeding 60 mV, a constant output voltage of approximately 7 V is produced which does not increase when the input voltage increases above 60 mV. In certain cases, such an arrangement may prove useful. However, the threshold voltage at which oscillation commences in a bipolar transistor may depend upon the speed of increase of the input voltage; it may even be that no oscillation takes place if the input voltage is less than 1 mV should the input voltage increase extremely slowly. In contrast, the use of a field effect transistor ensures automatic oscillation as soon as the input voltage reaches the level of about 10 mV.

In order to obtain an output power of around a mW (or even a few tens of W), it is necessary for the saturation resistance of the transistor to fall to a relatively low level and this may be achieved in two different way:

Firstly, it is possible to use a field effect power transistor of type V MOS or type D MOS, which have just appeared on the market. If necessary, several of these transistors may be connected in parallel.

The second solution resides in providing a field effect transistor in order to trigger an oscillation and one or more bipolar transistors to ensure the desired sufficiently low saturation resistance, that is to say in order to ensure that the desired power is available.

FIG. 2 shows a situation in which there is one field effect transistor having an insulated gate $T_{21}$ and two bipolar transistors $T_{22}$ and $T_{23}$. FIG. 2 shows a circuit diagram of a whole unit constituting a self-contained detector-emitter remote fire alarm comprising not only the circuit in question but also a thermocouple TC, a rectifier element 24, a power storage capacitor 25, a voltage relay selector CR and a radio emitter E. The transformer 26 comprises a secondary winding which is in two parts, one intended for operation of the oscillator and the other intended to increase the output pulse voltage.

In the voltage booster circuit, the three transistors $T_{21}$, $T_{22}$, and $T_{23}$ (the first being a field effect transistor with an insulated gate of type P and the others are bipolar transistors of the type PNP) are connected in parallel so that not only the input regions (source-drain region for the field effect transistor, emitter-collector regions for the bipolar transistors) are connected in parallel but also the three gates (base for the bipolar transistors, gate for the field effect transistor) are connected to one end of the secondary winding of the transistor 26. In operation this assembly is entirely adequate; in the absence of voltage at the base region, the bipolar transistors have a very high base input impedance, which allows the field effect transistor $T_{21}$ to start oscillation as if the two bipolar transistors did not exist. Once the oscillation has been triggered, the two bipolar transistors commence operation and, by a suitable choice of these transistors, it is possible to provide an overall saturation resistance of around 1 ohm or of a few ohms which can then be passed to the three operated portions which are connected in parallel.

It will be noted that the other end of the secondary winding of the transformer is, in this embodiment, connected to the source region of the transistor $T_{21}$ and not to its drain region. Since the source-drain voltage is always extremely low, this change is of no importance.

The capacitor 25 connected to a voltage boosting winding output of the transformer is charged via the diode 24 to a voltage which is even greater than that of the pulses at the gates of the transistors. Thus, the capacitor 25 may accumulate energy at a direct voltage of approximately 10 V. The presence of the bipolar transistors will prevent any significant increase in voltage above this level.

It will be seen from FIG. 2 that mounted at the terminals of the capacitor 25 is a voltage test relay selector CR. This relay selector, of a type well known in electronics, establishes contact when the voltage at its terminals reaches a certain level and breaks this contact when this voltage drops to a certain fraction K of this value. This relay has a very high impedance and consumes virtually no current when it is not operative, so that charging of the capacitor by the pulses from the voltage booster is not impaired by the relay. Downstream of the operating portion of the relay selector CR there is connected a radio transmitter E of a known type, transmitting a high frequency signal.

This transmitter circuit is made to operate under a given nominal voltage Un, for example 10 V, and it functions until it is supplied by a fraction, $KU_n$, of the nominal voltage (for example 6 V). The voltage relay selector CR is adapted to operate at these voltages, so that it connects the transmitter E to the capacitor 25 when the capacitor 25 has a voltage of approximately 10 V and then disconnects it when the voltage at this capacitor has discharged into the transmitter to a level of approximately 6 V.

If the transmitter E functions within a range of frequencies in excess of 50 MHz, and if it is provided with a suitably designed antenna, it will be able to transmit a signal having a range of about 1 km and consuming a supply power of the order of 100 mW. If the power delivered continuously by the thermocouple, via the capacitor 25 and the voltage booster circuit, is around 1 mW, the emitter E will function for a certain time and then will not operate for a time which is approximately 100 times longer. If the capacitor 25 has a value of around 100 F, it is possible to arrange the transmitter to operate for 10 ms approximately every 10 seconds. If the capacitor 25 has a substantially higher capacitance, it will be possible, for example, to obtain transmission periods of a few tenths of a second, separated by intervals of 30 to 90 seconds.

Advantageously, the transmitter E will transmit waves carrying a code modulation making it possible to recognize a particular transmitter among a vast number of similar transmitters, each of which transmitting a modulation coded in a manner which is peculiar to that transmitter.

FIG. 3 shows a circuit diagram of an alternative form of embodiment to that shown in FIG. 2. The thermocouple TC, the relay selector CR and the emitter E are identical to the corresponding parts in FIG. 2. On the other hand, the voltage boosting arrangement comprises, in FIG. 3, a P-channel field effect transistor having a diffused gate $T_{31}$, and a bipolar transistor $T_{32}$, of the type PNP. Once again, the operated regions of the two transistors are connected in parallel so that they are in series with the primary winding of the transformer 36. The transformer 36 comprises two secondary windings, one of which is connected to the gate of the field effect transistor $T_{31}$ and the other of which is connected to the base region of the bipolar transistor $T_{32}$. The two secondary windings have approximately the same number of turns, equivalent to 10 to 20 times the number of turns on the primary winding. In this embodiment, the bipolar transistor may have a very high capacitance and may even have a relatively low base impedance without jeopardising the triggering of oscillations in the field effect transistor $T_{31}$. Even a relatively low impedance at the base of the bipolar transistor could never short-circuit the operating voltage at the operating electrode of the bipolar transistor.

In this embodiment, the return connection of the secondary windings is via the negative electrodes of the transistors, that is to say via the drain region of the field effect transistor $T_{31}$ and the collector region of the bipolar transistor $T_{32}$. Furthermore, the rectifier diode 34 is placed on the side of the secondary winding which is connected to the base region of the bipolar transistor and not to the other side, as in FIG. 2.

The apparatus according to FIG. 3 functions in a manner similar to that of the apparatus described above with reference to FIG. 2. The circuit of FIG. 3 shows one of the many alternative constructions of "blocking oscillator" to form the voltage boosting circuit.

FIG. 4 shows diagrammatically and in cross-section a particularly advantageous construction of a self-contained detector-emitter remote fire alarm, functioning in the manner illustrated in FIGS. 2 and 3.

A metal casing 41 serves as a cold source for the detecting thermocouple 45 (TC in FIGS. 2 and 3) and is of sufficient mass that, by its thermal capacity, it ensures only a slow rise of internal temperature when the apparatus is in the flames from a fire. An insulating inner casing 42 holds all the electronic components shown in the diagram in FIGS. 2 or 3, and an assembly 43. The thermocouple 45 supplies electric voltage for the entire inner electronic equipment via a twin-conductor connecting cable 44. An antenna 46, connected to the electronic unit 43, passes through the metal case 41 by way of an insulated passage and also passes through an outer covering of insulating plastic material 47. The length of the antenna 46 extending out from the casing 41 is suitable for radio transmission. The coating composition of insulating material 47 acts as a heat shield and avoids heating of the interior of the apparatus. Only one active surface 48 of the thermocouple 45 appears on the outside, flush with the outer surface of the heat shield 47. In the event of fire, this heat shield maintains the inner casing 41 and the electronic unit 43 at a relatively low temperature so that under the effect of the temperature difference between its face which is in contact with the metal case 41 and its outwardly turned face, the thermocouple 45 provides a direct voltage to the electronics unit 43 which causes intermittent transmission of a coded radio signal in the manner explained above with reference to FIG. 2. The radio range of such a remote alarm transmitter is approximately 1 km. By distributing devices such as that shown in FIG. 4 quite densely through a forest in which there is a risk of fire, it is possible to use only a small number of relays which are relatively readily accessible and which are supplied from a particular source of power, each relay re-transmitting any signals emanating from the various alarm transmission and detection units, each being particularly coded. The relays may be approximately 100 times fewer in number than the remote detector transmitter alarm units. A central monitoring station will receive the signals from the various relay stations and, due to the use of coded signals, may easily locate the place where a fire has started.

These rugged, tightly sealed and self-contained detector-transmitter units require no maintenance. Since such simple self-contained detectors require only a few relays which need a power supply and which may be disposed at readily accessible places for servicing, this allows a high density of measurement or detection points, a high density which alone allows effective protection of forests against fire, via very rapid detection of any fire.

The devices described above with reference to the drawings for rendering a source of very low voltage suitable for self-contained usage may likewise find many other applications in any circumstances where it is necessary to know, at least intermittently, the values of various parameters at places to which access is difficult. A unit similar to that which has just been described but which is made to much smaller dimensions and having only a very restricted emission range would be very useful of example on a movable part of a motor or engine as a means of signalling an excessive rise in temperature or an excessive temperature gradient between two points without such detection requiring a direct material link which may be difficult to establish and subject to disturbance.

It would also be possible to use such devices as microprobes for studying various phenomena inside the human body or the body of an animal. In this case, bioelectric pick-ups would be used as a source of very low voltage. Although these latter can provide only currents which are very small, an operable ultraminiature unit could be constructed, having regard to the fact that the transmission power would be extremely low. Indeed, very sensitive receivers placed on the surface of a living body into which such probes could be introduced are capable of picking up high frequency emissions of a fraction of nW, or even a few pW.

It would likewise be possible to place self-contained pick-ups at places where radioactivity had to be tested.

Generally speaking, the electronic device described above with reference to the drawings makes it possible to use as an energy source for various electronic devices any pick-up which delivers only a very low voltage (a few mV, preferably but not necessarily of low impedance).

I claim:

1. A DC to DC voltage converting device for enhancing a very low DC voltage from a source such as a thermocouple, comprising:
   two input terminals for connection to said DC source,
   a first, field effect, transistor means having the property of providing substantial source-drain conduction in response to a substantially zero voltage across a control path thereof between its gate and one of its source and drain electrodes,
   a primary winding connected in series relationship with the source-drain path of said first field effect transistor means across said two input terminals,
   at least a second transistor means defining a main conducting path between two main electrodes thereof and further having a control electrode,
   said main conducting path of said second transistor means being coupled across the source-drain path of said first field effect transistor means,
   a secondary winding cooperating with said primary winding for defining therewith a transformer having a high turns ratio of the secondary winding relative to the primary winding,
   said control path of said first field effect transistor means being coupled across at least a portion of said secondary winding, so that oscillations are initiated due to said source-drain conduction in response to a substantially zero voltage across said control path of said field effect transistor means,
   means for coupling said oscillations between said control electrode of said second transistor means and one main electrode of said second transistor means, and
   a DC output circuit having a rectifying means and coupled between one end of said secondary winding and the control electrode of said second transistor means.

2. A DC to DC voltage converting device according to claim 1, wherein the control path defined between the gate and one of the main electrodes of said first field effect transistor means is coupled between the other end of said secondary winding and an intermediate tap provided in said secondary winding, and
   said means for coupling comprises means for connecting the control electrode of the second transistor means to said other end of the secondary winding.

3. A DC to DC voltage converting device according to claim 1, wherein
   the control path defined between the gate and one of the main electrodes of said first, field effect, transistor means is coupled across the two ends of said secondary winding, and
   said means for coupling comprises another secondary winding of said transformer, having one end common with said first secondary winding and having its other end connected to the control electrode of said second transistor.

4. A DC to DC voltage converting device according to claim 1, wherein the second transistor means comprises a bipolar transistor.

5. A DC to DC voltage converting device according to claim 1, wherein the second transistor means is comprised of two bipolar transistors.

6. A DC to DC voltage converting device according to claim 1, further comprising a capacitor connected in said DC output circuit.

7. A self-contained detector-transmitter fire alarm unit comprising:
   fire sensing means adapted to deliver a very low and intermittent DC voltage upon fire condition,
   a DC to DC enhancing voltage converter coupled to said fire sensing means and adapted to deliver at its output upon a fire condition a DC supply voltage suitable for operating radio transmitter circuitry, and
   a radio transmitter circuit connected across the output of said DC to DC enhancing voltage converter.

8. A self-contained detector-transmitter fire alarm unit according to claim 7, wherein said fire sensing means comprises a thermocouple.

9. A self-contained detector-transmitter fire alarm unit according to claim 8, wherein
   a metal casing includes the DC to DC enhancing voltage converter and the radio transmitter,
   an insulating mass forming a heat shield encloses the metal casing,
   the thermocouple has two faces, one said face being in contact with the metal casing and the other said face being exposed to the ambient atmosphere outside of the insulating mass, and
   an antenna formed by a conductor wire which is coupled with the radio transmitter emerges from the metal casing and the insulating mass.

10. A self-contained detector-transmitter fire alarm unit according to claim 7, wherein the DC to DC enhancing voltage converter is of the type defined in claim 1.

11. A self-contained detector-transmitter fire alarm unit according to claim 7, wherein the DC to DC enhancing voltage converter comprises:
  two input terminals for connection to said fire sensing means,
  at least a first, field effect, transistor means having the property of providing substantial source-drain conduction in response to a substantially zero voltage across a control path thereof, between its gate and one of its source and drain electrodes,
  a primary winding connected in series relationship with the source-drain path of said first field effect transistor means across said two input terminals,
  a secondary winding cooperating with said primary winding for defining therewith a transformer having a high turns ratio of the secondary winding relative to the primary winding,
  said control path of the said first, field effect, transistor means being coupled across at least a portion of said secondary winding, so that oscillations are initiated due to said source-drain conduction in response to a substantially zero voltage, across said control path of said field effect transistor means, and
  a DC output circuit having a rectifying means and coupled between the two ends of said secondary winding.

12. A self-contained detector-transmitter fire alarm unit according to claim 7, wherein the DC to DC enhancing voltage converter includes a capacitor connected across the two output terminals of the converter.

13. A self-contained detector-transmitter fire alarm unit according to claim 7, further including a threshold circuit connected between the output of said DC to DC enhancing voltage converter and the said radio transmitter for connecting said output of the converter to the radio transmitter when the voltage at said output reaches the nominal operating voltage of the radio transmitter to supply the radio transmitter and for cutting off the supply voltage of the radio transmitter when the voltage on the output of said converter falls below the minimum value for operating the radio transmitter.

14. A unit according to claim 13 in which the said thermocouple has a sensitivity of about 1 mV/°C. and an inner impedance of less than 1 ohm, the number and power of the said at least one transistor is sufficient for the resulting impedance of the controlled portions of the at least one transistor, in the saturation state, to be about 1 ohm so that the power $P_f$ at which the electrical energy is provided to the said capacitor under a voltage exceeding 2 V, is of about 1 mW when the temperature difference between the two junctions of the thermocouple is at least about 50° C., the said radio transmitter consuming an instantaneous power $P_c$, equivalent to a number of mW, the said nominal voltage $U_n$ for operation of the radio transmitter being between 2 and 10 V and the said given fraction $KU_n$ of this nominal voltage being of the order of $\frac{2}{3} U_n$, the said capacitor being dimensioned so that during the course of a discharge period in which the capacitor voltage is reduced in the ratio of 1:K, the capacitor provides the power needed for operation of the transmitter during an emission period $T_{em}$ of at least 10 ms, the transmission periods following one another at a repetition rate of approximately $T_{em} \cdot P_c / P_f$.

15. A unit according to claim 13, wherein the said capacitor, at a consumed power $P_c$ for the said ratio transmitter of around 10 mW, provides a transmission period $T_{em}$ within the range from 50 to 100 ms and provides a repetition rate in the range from 10 to 60 seconds.

16. A self-contained detector-transmitter fire alarm unit according of claim 7, wherein
  said very low and intermittent DC voltage delivered by said fire sensing means is between 5 mV and 200 mV and,
  said DC supply voltage suitable for said electronic circuitry is between 1 V and 10 V.

17. A self-contained detector-transmitter fire alarm unit according to claim 16, wherein the thermocouple has a sensitivity about 1 mV/°C. and an internal impedance less than 1 ohm.

18. A self-contained detector-transmitter fire alarm unit according to claim 17, wherein said DC to DC enhancing voltage converter includes at least one transistor which defines a conduction path between two main electrodes thereof having an impedance less than 10 ohms in the saturation state.

19. A unit comprising a self-contained detector-transmitter remote fire alarm comprising a thermocouple device furnishing a very low voltage at a very low impedance, the unit comprising:
  an oscillator circuit comprising at least one transistor (T1, T21, T31) of which the or at least one is a field effect transistor, the controlled electrodes of all the transistors being in parallel, and a transformer (2, 26, 36) having a primary and at least a secondary winding having different numbers of turns so that they have between them a high turns ratio, the primary winding being connected in series to the controlled electrodes of the at least one transistor and the at least a secondary winding being connected between the controlling electrodes of the at least one transistor and another electrode of the at least one transistor, the said thermocouple (TC, 45) device being connected across the primary winding and the controlled electrodes of the at least one transistor, the at least a secondary winding furnishing voltage pulses which are of usable amplitude;
  a capacitor (25, 35) connected to the at least a secondary winding via a rectifier (24, 34) for accumulating the electrical energy provided by each of the said voltage pulses;
  a radio transmitter circuit (E) comprising at least one active element having a nominal supply voltage $U_n$ and operable at a given fraction $KU_n$ of this nominal voltage;
  a threshold circuit (CR) having substantially nil power consumption in the non-passing state and connected between the said capacitor (25, 35) and the said radio transmitter (E) and for connecting the radio transmitter with power when the voltage at the capacitor reaches the said nominal voltage $U_n$ and for disconnecting the radio transmitter from the capacitor when the voltage at the capacitor drops to the said given fraction $KU_n$ of the said nominal voltage, the said transmitter being provided with a high frequency circuit and an antenna giving a range about 1 km and transmitting oscillations modulated according to a code which upon reception, makes it possible to recognize the transmitter from among others;
  a metal case (41) housing the oscillator circuit, the rectifier element (24, 34), the capacitor (25, 35) and the at least one active component of the radio transmitter, the metal case having a high thermal inertia and being enclosed by an insulating mass (47) constituting a heat shield, the said thermocouple (TC, 45), in the form of a capsule having two junctions, being disposed in the thickness of the heat shield with one junction in contact with the metal case while its other junction (48) is exposed to the ambient atmosphere, whereby the whole forms a compact unit which exposes only the outer surface of the heat shield to the ambient atmosphere, one junction of the thermocouple and the antenna (46) formed by a conductor wire emerging from the heat shield.

* * * * *